US007789950B2

(12) United States Patent
Hoffman et al.

(10) Patent No.: US 7,789,950 B2
(45) Date of Patent: Sep. 7, 2010

(54) AIR DRYER WITH OIL REMOVAL FILTER

(75) Inventors: Fred W. Hoffman, Columbia Station, OH (US); Leonard A. Quinn, Lagrange, OH (US); William P. Fornof, Girard, PA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 282 days.

(21) Appl. No.: 11/763,545

(22) Filed: Jun. 15, 2007

(65) Prior Publication Data

US 2008/0307965 A1 Dec. 18, 2008

(51) Int. Cl.
*B01D 53/18* (2006.01)
*B01D 53/26* (2006.01)
(52) U.S. Cl. .................................. 96/134; 55/DIG. 17
(58) Field of Classification Search .................. 95/118, 95/119, 121, 122, 148; 96/134; 55/DIG. 17, 55/DIG. 25; 34/332, 80
See application file for complete search history.

(56) References Cited

U.S. PATENT DOCUMENTS

| | | | |
|---|---|---|---|
| 3,464,186 A * | 9/1969 | Walker et al. .................. 96/115 |
| 3,796,025 A * | 3/1974 | Kasten .......................... 96/136 |
| 4,572,725 A * | 2/1986 | Kojima ......................... 96/137 |
| 4,816,047 A * | 3/1989 | Neal ............................ 96/137 |
| 5,002,593 A | 3/1991 | Ichishita et al. |
| 5,286,283 A | 2/1994 | Goodell |
| 5,334,230 A | 8/1994 | Sloka |
| 5,427,609 A * | 6/1995 | Zoglman et al. ................ 95/98 |
| 5,607,500 A * | 3/1997 | Shamine et al. ................ 96/144 |
| 5,622,544 A * | 4/1997 | Shamine et al. ................ 96/134 |
| 6,076,272 A * | 6/2000 | Conklin et al. .................. 34/80 |
| 6,319,296 B1 | 11/2001 | Fornof |
| 6,514,051 B2 | 2/2003 | Fornof et al. |
| 6,527,839 B2 | 3/2003 | Fornof et al. |
| 6,723,154 B2 * | 4/2004 | Olsson et al. .................. 95/118 |
| 6,786,953 B2 | 9/2004 | Fornof et al. |
| 6,951,581 B2 | 10/2005 | Fornof et al. |
| 7,008,472 B2 | 3/2006 | Fornof et al. |

(Continued)

FOREIGN PATENT DOCUMENTS

WO 2005051521 A1 6/2005

OTHER PUBLICATIONS

Bendix Commercial Vehicle Systems LLC, SD-08-2414 Bendix AD-IP Integral Purge Air Dryer Service Data data sheet, May 2007, 28 pages, Bendix Commercial Vehicle Sysytems, Elyria Ohio U.S.A.

(Continued)

*Primary Examiner*—Frank M Lawrence
(74) *Attorney, Agent, or Firm*—Calfee, Halter & Griswold LLP

(57) ABSTRACT

An air dryer, used in a compressed air system, includes an oil coalescing element for agglomerating oil in compressed air passing through the oil coalescing element in a first direction during a charging cycle and passing through the oil coalescing element in a second direction during a purging cycle. A drying material, which is downstream of the oil coalescing element during the charging cycle and upstream of the oil coalescing element during the purging cycle, reduces moisture in the compressed air during the charging cycle.

15 Claims, 3 Drawing Sheets

U.S. PATENT DOCUMENTS

| | | | |
|---|---|---|---|
| 7,285,149 | B2 | 10/2007 | Fornof et al. |
| 7,320,316 | B2 | 1/2008 | Moncelle et al. |
| 7,434,571 | B2 | 10/2008 | Moncelle et al. |
| 7,625,436 | B2 | 12/2009 | Paling et al. |
| 2004/0163535 | A1* | 8/2004 | Fornof et al. .................. 95/122 |
| 2008/0289505 | A1 | 11/2008 | Milomo |
| 2009/0038476 | A1 | 2/2009 | Blackwood et al. |

OTHER PUBLICATIONS

European Search Report for EP Application 08158035.9, dated Jan. 26, 2010.

European Written Opinion for EP Application No. 08158035.9, dated Jan. 26, 2010.

American Standard Companies, Inc., Air System Protector-Air Dryer Cartridge with Coalescing Filter, product brochure, Jun. 3, 2005, 3 pages, U.S.A.

* cited by examiner

AIR DRYER WITH OIL REMOVAL FILTER

BACKGROUND

The present invention relates to a compressed air system, and specifically an air dryer assembly for the compressed air system that removes moisture and oil. It finds particular application in conjunction with a compressor system for vehicles that use pressurized air to selectively control application of vehicle brakes, and for other air operated systems associated with the vehicle, and will be described with particular reference thereto. It will be appreciated, however, that the invention is also amenable to other applications.

Compressed air systems are used in conventional brake systems, for example, to provide and maintain air under pressure to operate vehicle brakes and auxiliary air systems. Water, particulates, and oil in the compressed air system can lead to component degradation and interfere with optimal operation of the system. An air dryer is usually incorporated into the system to remove water from the compressed air. The air dryer collects and removes air system contaminants in solid, liquid, and vapor form before the contaminants enter the system. The air dryer delivers clean, dry air for braking system components, thereby increasing system life and reducing maintenance costs.

An air brake compressor is typically supplied with oil from the vehicle engine in order to lubricate bearings and other components of the compressor. As will be appreciated, it is difficult to contain the oil in the compressor and oil occasionally becomes entrained in the pressurized air stream exiting the compressor. Modern air dryers use a desiccant material to adsorb water vapor as it passes through an air line from the compressor toward a reservoir or downstream components. The operation and efficiency of the desiccant is adversely affected by oil and, thus, it is desirable to reduce/minimize contamination of the desiccant with oil by employing a filtering element or oil filter that effectively removes the oil from the air stream.

The present invention provides a new and improved apparatus and method which addresses the above-referenced problems.

SUMMARY

In one aspect of the present invention, it is contemplated that an air dryer, used in a compressed air system, includes an oil coalescing element for agglomerating oil in compressed air passing through the oil coalescing element in a first direction during a charging cycle and passing through the oil coalescing element in a second direction during a purging cycle. A drying material, which is downstream of the oil coalescing element during the charging cycle and upstream of the oil coalescing element during the purging cycle, reduces moisture in the compressed air during the charging cycle.

In one embodiment, it is contemplated that the coalescing element is compressed in an axial direction.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
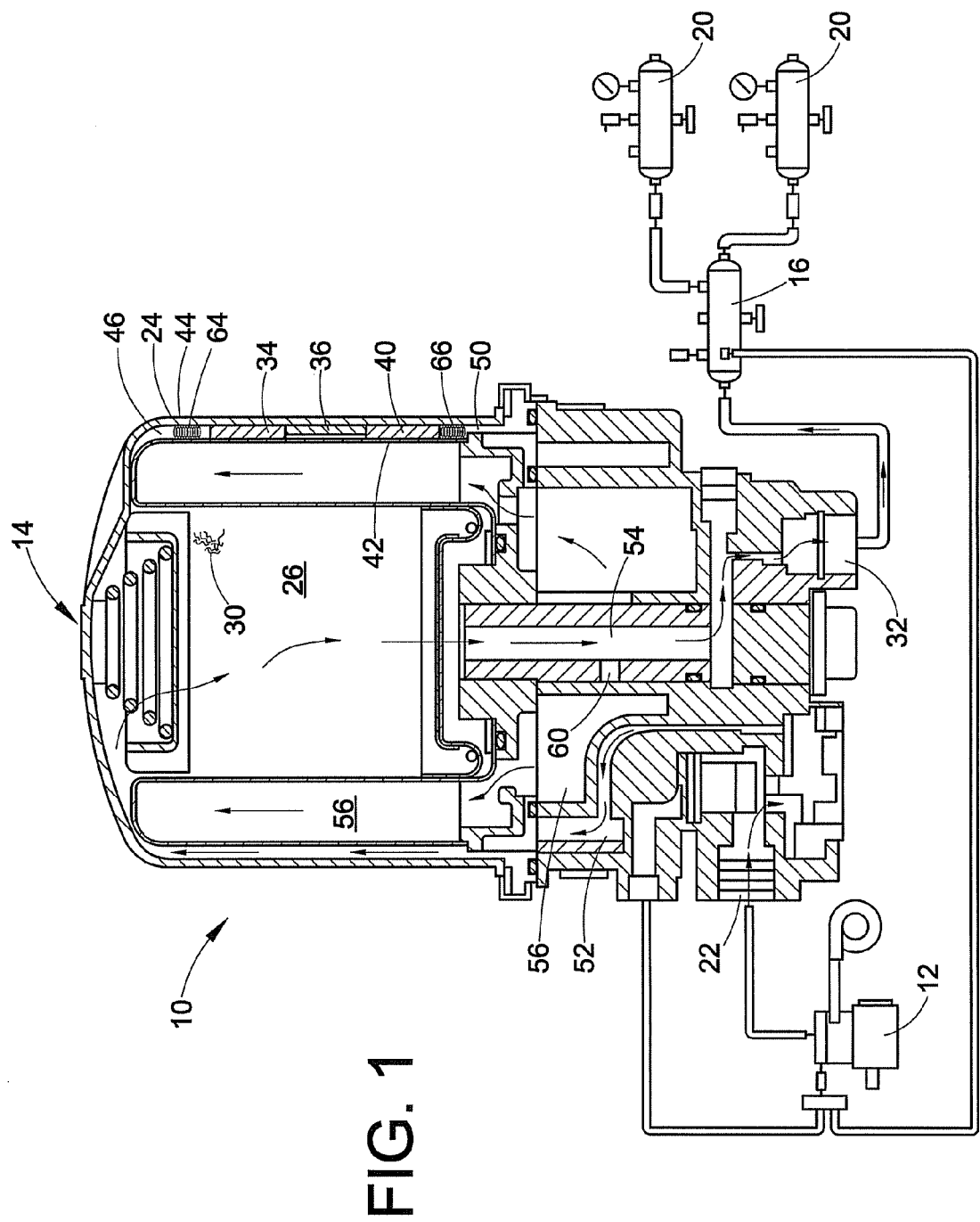
FIG. 1 illustrates a schematic representation of an air dryer system in a charging cycle in accordance with one embodiment of an apparatus illustrating principles of the present invention.

With reference to FIG. 1, a simplified component diagram of an exemplary air dryer system 10 is illustrated in accordance with one embodiment of the present invention. A source of compressed air 12 (e.g., a compressor) produces compressed air. The compressed air is fluidly communicated from the compressor 12 to an air dryer 14. As described in more detail below, the air dryer 14 treats the compressed air. The treated compressed air is then fluidly communicated from the air dryer 14 to a reservoir 16, where it is stored for use in various components 20 requiring compressed air.

The air dryer 14 includes a supply port 22, which receives the compressed air from the compressor 12. A supply passage 24 fluidly communicates with the supply port 22 and a desiccant volume 26. The desiccant volume 26 includes a drying material 30 (e.g., a desiccant). The desiccant volume 26 fluidly communicates with a delivery port 32. The delivery port 32 fluidly communicates with the reservoir 16.

A first oil separating element 34, a coalescing element 36, and a second oil separating element 40 are included in the supply passage 24. It is contemplated that the oil separating elements 34, 40 are a crushed aluminum material. It is also contemplated that the coalescing element 36 is a crushed aluminum or glass material. However, embodiments in which the oil separating elements 34, 40 and the coalescing element 36 are made from other materials are also contemplated.

In the illustrated embodiment, the oil separating elements 34, 40 and the coalescing element 36 are configured to substantially extend from an inner wall 42 of the supply passage 24 to an outer wall 44 of the supply passage 24. In this manner, the oil separating elements 34, 40 and the coalescing element 36 are radially compressed between the inner and outer walls 42, 44, respectively. Therefore, substantially all of the compressed air flowing between a first port 46 of the supply passage 24 and a second port 50 of the supply passage 24 flows through—not around—the oil separating elements 34, 40 and the coalescing element 36.

The air dryer 14 operates in two (2) different modes. The first mode of operation is a charging mode or cycle (FIG. 1), and the second mode of operation is a purging mode or cycle (FIG. 2).

During the charging mode (FIG. 1), the compressed air from the compressor 12 is communicated to the dryer 14, where the air is treated before being communicated to the reservoir 16. More specifically, the air enters the air dryer 14 via the supply port 22 and flows through an entry passage 52 in a direction of the illustrated arrows in FIG. 1. The compressed air is communicated from the entry passage 52 to the second port 50 of the supply passage 24. The compressed air flows through the second oil separating element 40, the coalescing element 36, and the first separating element 34 before exiting the supply passage 24 via the first port 46. The compressed air then flows through the drying material 30, which is downstream of the oil separating elements 34, 40 and the coalescing element 36 during the charging mode, and a delivery passage 54 before exiting the dryer 14 via the delivery port 32. A portion of the compressed air flowing through the delivery passage 54 enters a purge volume 56 via a purge passage 60. The air in the purge volume 56 is used during the purging mode, which is discussed below.

Figure 2:
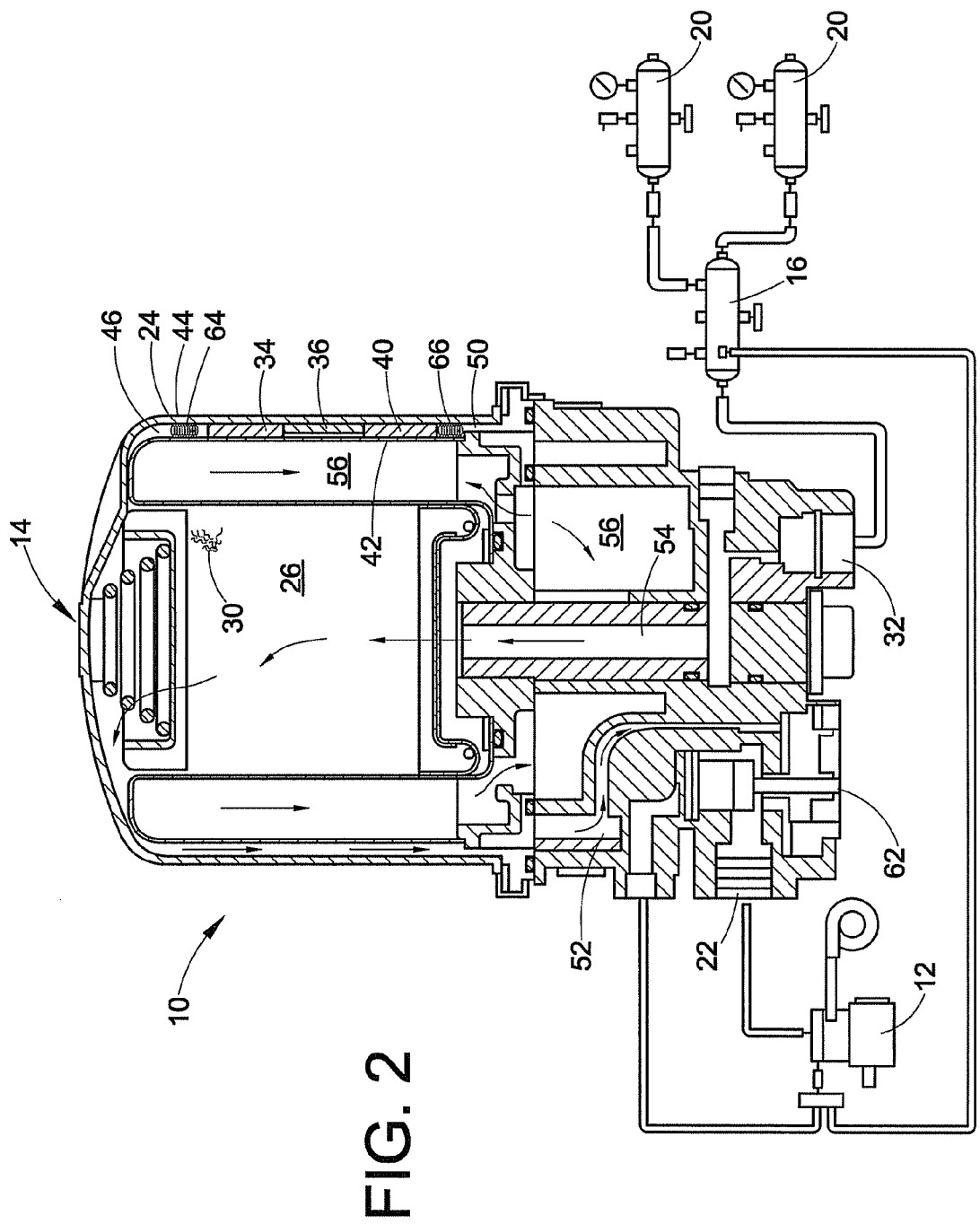
FIG. 2 illustrates a schematic representation of the air dryer system of FIG. 1 in a purging cycle in accordance with one embodiment of an apparatus illustrating principles of the present invention.

With reference to FIG. 2, during the purging mode the previously cleaned and dried compressed air in the purge volume 56 is fluidly communicated to the delivery passage 54 via the purge passage 60. The air flows from the purge passage 60 to the first port 46 of the supply passage 24 via the drying material 30. From the first port 46, the air flows through the first oil separating element 34, the coalescing element 36, and the second oil separating element 40 before exiting the supply passage 24 via second port 50. Therefore, the drying material 30 is upstream of the oil separating elements 34, 40 and the coalescing element 36 during the purging cycle. The air flows from the second port 50 to the entry passage 52 and exits the air dryer 14 via a purge port 62.

First and second compressing elements 64, 66, respectively, in the supply passage 24 exert compressive forces on the oil separating elements 34, 40 and the coalescing element 36 in an axial direction (e.g., in a direction along a length of the supply passage 24). In this manner, the compressing elements 64, 66 and the oil separating elements 34, 40 compress (reinforce) the coalescing element 36 in an axial direction along the coalescing element 36. In one embodiment, a length of the oil separating elements 34, 40 and the coalescing element 36 is reduced from about 3.400 inches to about 3.190 inches (i.e., about 0.210 inches). The force required to compress the oil separating elements 34, 40 and the coalescing element 36 by about 0.210 inches is about 290 lbs. In addition, the area of the coalescing element 36 is, for example, about 8.14 in². Therefore, the force to compress the oil separating elements 34, 40 and the coalescing element 36 is about 35.6 lbs./in². In other embodiments, it is contemplated that the coalescing element 36 is compressed between about 25 lbs./in² and about 50 lbs./in². As discussed in more detail below, compression values above about 25 lbs./in² have been found to sufficiently compress the coalescing element 36 for reducing breaching of the coalescing element 36 caused by pressure differentials encountered during transitions between the charging and purging cycles. In addition, compression values below about 50 lbs./in² have been found to allow sufficient airflow through the coalescing element 36 so as not to restrict airflow during the charging and purging cycles.

In one embodiment, the compressing elements 64, 66 are springs. In the illustrated embodiment, the first compressing element 64 is positioned between the first port 46 of the supply passage 24 and the first oil separating element 34. Similarly, the second compressing element 66 is positioned between the second port 50 of the supply passage 24 and the second oil separating element 40. The compressive force from the first compressing element 64 is transmitted to the coalescing element 36 via the first oil separating element 34; the compressive force from the second compressing element 66 is transmitted to the coalescing element 36 via the second oil separating element 40. Therefore, because the coalescing element 36 is against and between the oil separating elements 34, 40, the coalescing element 36 receives the respective compressive forces at both ends. As discussed in more detail below, other embodiments in which the compressing elements 64, 66 are not springs are also contemplated.

With reference to FIGS. 1 and 2, during the charging mode, the compressed air entering the supply passage 24 first passes through the second oil separating element 40, which reduces the amount of liquid oil in the compressed air. The compressed air next passes through the coalescing element 36, which agglomerates oil droplets (e.g., oil droplets in an aerosol form) in the compressed air into larger droplets (e.g., liquid oil). The compressed air containing the agglomerated oil then passes through the first oil separating element 34, which further reduces the amount of liquid oil in the compressed air. Consequently, the compressed air exiting the supply passage 24 via the first port 46 includes significantly less oil than the compressed air entering the supply passage 24 via the second port 50. Moisture in the compressed air is adsorbed by the drying material 30 so that the compressed air entering the delivery passage 54 includes significantly less oil and moisture than the compressed air entering the supply port 22. In one embodiment, it is contemplated that the compressed air entering the delivery passage 54 includes less than or equal to about 1 part-per-million (ppm) oil by weight.

During the purging mode, the previously cleaned and dried air from the purge volume 56 removes moisture from the drying material 30 and a portion of the oil in the oil separating elements 34, 40 and the coalescing element 36 before exiting the air dryer 14 via the purge port 62. In one embodiment, it is contemplated that up to about 99% of the oil is removed from the oil separating elements 34, 40 and the coalescing element 36 during the purging mode.

Compressing the coalescing element 36 along an axial direction as discussed above increases a durability of the coalescing element 36 in terms of reducing breaching caused by pressure differentials encountered during transitions between the charging and purging cycles. In other words, the compressed coalescing element 36 has increased durability when subjected to bi-directional airflow therethrough. Therefore, the compressing elements 64, 66, the compressed oil separating elements 34, 40, and/or the axially compressed coalescing element 36 act as a means for reducing breaching and increasing durability of the coalescing element 36. More specifically, compression increases the durability of the coalescing element 36 by preventing movement of micro-sized media (e.g., glass and/or aluminum) in the coalescing element 36 during the charging and purging cycles.

It is to be understood that although the illustrated embodiment includes two (2) compressing elements 64, 66, other embodiments including any other number of the compressing elements (e.g., zero (0), one (1), etc.) are also contemplated.

Figure 3:
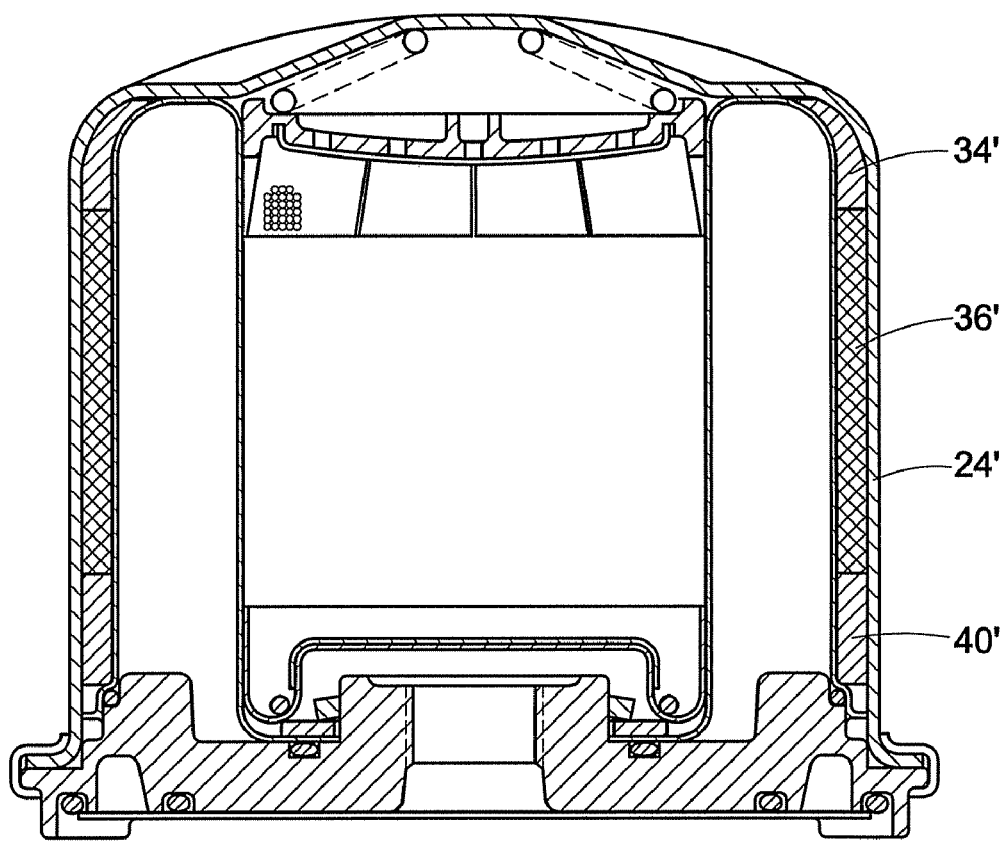
FIG. 3 illustrates a schematic representation of an air dryer in accordance with another embodiment of an apparatus illustrating principles of the present invention.

FIG., 3 illustrates an embodiment including no compressing elements. For ease of understanding this embodiment, like components are designated by like numerals with a primed (') suffix and new components are designated by new numerals. With reference to FIG. 3, the oil separating elements 34', 40' and the coalescing element 36' are included in the supply passage 24' without any compressing elements. It is contemplated that the oil separating elements 34', 40' and the coalescing element 36' fill the supply passage 24' to exert the compressive forces on the coalescing element 36'.

It is even contemplated in other embodiments that only one of the oil separating elements is included in the supply passage—with or without the compressing element(s)—along with the coalescing element. For example, if only one oil separating element is included in the supply passage along with the coalescing element and without any compressing elements, the single oil separating element and the coalescing element are sized to substantially fill the supply passage to create the compressive forces on the coalescing element. Alternately, the supply passage may include a single oil separating element, the coalescing element, and a single compressing element. In this case, the single compressing element is substituted for one of the separating elements shown in FIGS. 1-3.

As discussed in above, with reference again to FIGS. 1 and 2, other embodiments in which the compressing elements 64, 66 are not springs are also contemplated. For example, the compressing elements 64, 66 may be corrugated plastic.

Figure 4:
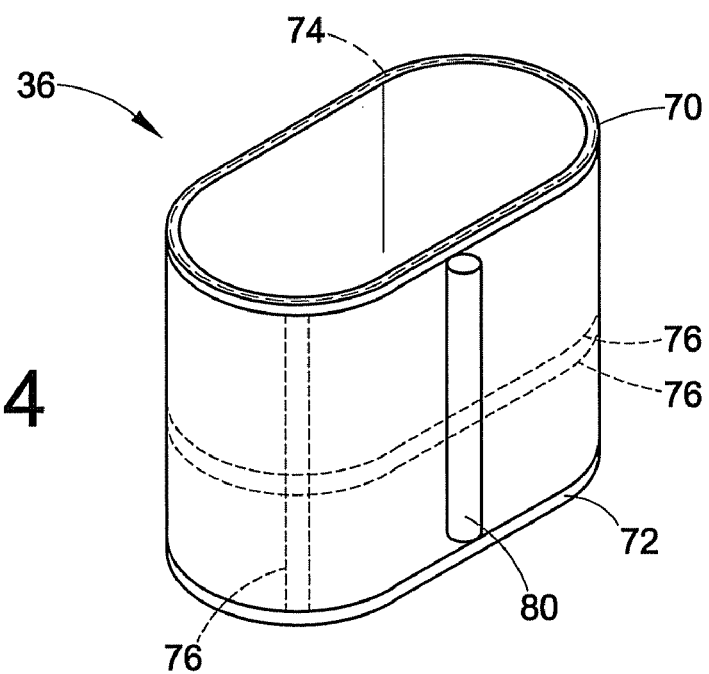
FIG. 4 illustrates a schematic representation of a coalescing element in accordance with one embodiment of an apparatus illustrating principles of the present invention.

As discussed above, it is contemplated that the coalescing element 36 is a crushed aluminum or glass material. With reference to FIG. 4, it is contemplated in one embodiment that the coalescing element 36 also includes one or more plastic rings 70, 72 at respective end(s). The one or more plastic rings 70, 72 offer additional reinforcement to the coalescing element 36. It is also contemplated that the coalescing element 36 includes one or more layers 74 of coalescing material sewn together via stitching 76. In yet another embodiment, it is contemplated that one or more bolts 80 is included along the axis of the coalescing element 36 to offer even more reinforcement. In the embodiment including the bolt 80, it is contemplated that the coalescing element 36 may be installed in the dryer 14 at a location other in the supply passage 24. For example, the coalescing element 36 may installed in an end cover (with or without check valves) of the dryer 14.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An air dryer used in a compressed air system, the air dryer comprising:
    an oil coalescing element for agglomerating oil in compressed air passing through the oil coalescing element in a first direction during a charging cycle and passing through the oil coalescing element in a second direction during a purging cycle;
    a drying material, downstream of the oil coalescing element during the charging cycle and upstream of the oil coalescing element during the purging cycle, for reducing moisture in the compressed air during the charging cycle;
    a first oil separating element for reducing the agglomerated oil from the compressed air;
    a second oil separating element for reducing the agglomerated oil from the compressed air, wherein the first oil separating element is downstream of both the oil coalescing element and the second oil separating element during the charging cycle;
    a first compressing element contacting an end of the first oil separating element, which does not contact the oil coalescing element; and
    a second compressing element contacting an end of the second oil separating element, which does not contact the oil coalescing element; wherein the first and second compressing elements compress the oil coalescing element via the first and second oil separating elements, respectively.

2. The air dryer as set forth in claim 1, wherein the oil coalescing element is compressed axially between the first and second oil separating elements.

3. The air dryer as set forth in claim 2, wherein:
    the compressed air flows in a first axial direction through the oil coalescing element during the charging cycle;
    the compressed air flows in a second axial direction through the oil coalescing element during the purging cycle; and
    the first axial direction is substantially opposite the second axial direction.

4. The air dryer as set forth in claim 1, wherein the oil coalescing element is compressed along an axial direction of the coalescing element.

5. The air dryer as set forth in claim 4, wherein the oil coalescing element is compressed between about 25 lbs./in$^2$ and about 50 lbs./in$^2$ along the axial direction of the coalescing element.

6. The air dryer as set forth in claim 5, wherein the oil coalescing element is compressed about 35.6 lbs./in$^2$ along the axial direction of the coalescing element.

7. The air dryer as set forth in claim 4, wherein the oil coalescing element is also compressed along a radial direction of the coalescing element.

8. The air dryer as set forth in claim 4, wherein the compressed oil coalescing element has increased durability to pressure differentials encountered during transitions between the charging cycle and the purging cycle.

9. The air dryer as set forth in claim 1, wherein up to about 99% of the agglomerated oil is removed from the oil coalescing element during the purging cycle.

10. The air dryer as set forth in claim 1, wherein a majority of the oil in the compressed air is agglomerated in the oil coalescing element during the charging cycle.

11. The air dryer as set forth in claim 10, wherein one of less than and equal to about 1 ppm by weight of the oil in the compressed air is passed through the oil coalescing element without being agglomerated.

12. An air dryer comprising:
    an oil coalescing element for agglomerating oil in compressed air passing through the oil coalescing element during a charging cycle;
    a drying material, downstream of the oil coalescing element during the charging cycle and upstream of the oil coalescing element during a purging cycle, for reducing moisture in the compressed air during the charging cycle; and
    means for increasing durability of the oil coalescing element during pressure differentials caused by transitions between the charging cycle and the purging cycle, wherein the means for increasing durability includes;
        a first oil separating element at a first end of the oil coalescing element;
        a first compressing element compressing the oil coalescing element against the first oil separating element;
        a second oil separating element at a second end of the oil coalescing element; and
        a second compressing element compressing the oil coalescing element against the second oil separating element.

13. The air dryer as set forth in claim 12, wherein the first and second compressing elements are springs.

14. The air dryer as set forth in claim 12, wherein the first and second compressing elements are corrugated plastic.

15. An air dryer system comprising:
- a source of compressed air;
- an air dryer for reducing moisture and oil in the compressed air, the air dryer including:
  - a supply port for receiving the compressed air from the source;
  - an oil coalescing element for agglomerating the oil in the compressed air passing in a first direction through the oil coalescing element during a charging cycle and passing in a second direction through the oil coalescing element during a purging cycle;
  - a drying material, downstream of the oil coalescing element during the charging cycle and upstream of the oil coalescing element during the purging cycle, for reducing the moisture in the compressed air during the charging cycle;
  - a first oil separating element in the supply passage for reducing the agglomerated oil from the compressed air;
  - a second oil separating element in the supply passage; wherein the first oil separating element is downstream of both the oil coalescing element and the second oil separating element during the charging cycle;
  - a first compressing element contacting an end of the first oil separating element, which does not contact the oil coalescing element; and
  - a second compressing element contacting an end of the second oil separating element, which does not contact the oil coalescing element;
  - wherein the first and second compressing elements compress the oil coalescing element via the first and second oil separating elements, respectively; and
  - a delivery port for delivering the compressed air including reduced moisture and reduced oil; and
- a component receiving the compressed air with reduced moisture and reduced oil from the delivery port.

* * * * *